United States Patent
Hanssen et al.

(10) Patent No.: US 7,601,026 B2
(45) Date of Patent: Oct. 13, 2009

(54) CARD-THROUGH-CONNECTOR FASTENER FOR REDUCING CONNECTOR DISTORTION

(75) Inventors: Steven A. Hanssen, San Jose, CA (US); Jr-Yi Shen, Sunnyvale, CA (US); James F. Sullivan, San Jose, CA (US); Hung H. Quach, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 157 days.

(21) Appl. No.: 11/888,376

(22) Filed: Jul. 31, 2007

(65) Prior Publication Data

US 2009/0035962 A1     Feb. 5, 2009

(51) Int. Cl.
*H01R 13/74* (2006.01)

(52) U.S. Cl. .................... 439/573; 439/76.1; 361/685; 361/740

(58) Field of Classification Search .................. 439/573, 439/76.1, 564, 566, 571, 572; 361/685, 740, 361/747, 759, 752
See application file for complete search history.

(56) References Cited

U.S. PATENT DOCUMENTS

| | | | | |
|---|---|---|---|---|
| 4,908,715 | A * | 3/1990 | Krum et al. ............... | 360/97.02 |
| 5,277,615 | A * | 1/1994 | Hastings et al. ............. | 439/377 |
| 5,502,604 | A * | 3/1996 | Furay ....................... | 360/97.01 |
| 5,881,454 | A * | 3/1999 | Baxter et al. ................... | 29/843 |
| 5,931,697 | A * | 8/1999 | Jeong ......................... | 439/556 |
| 6,078,155 | A * | 6/2000 | Tominaga et al. ........... | 318/293 |
| 6,424,523 | B1 | 7/2002 | Curtis et al. | |
| 6,519,110 | B2 * | 2/2003 | Dague et al. .............. | 360/97.01 |
| 6,764,344 | B2 * | 7/2004 | Maiers ........................ | 439/629 |
| 6,908,330 | B2 | 6/2005 | Garrett et al. | |
| 7,170,742 | B2 * | 1/2007 | Na et al. ...................... | 361/684 |
| 7,408,784 | B2 * | 8/2008 | Weech et al. ................. | 361/724 |
| 2002/0055292 | A1 | 5/2002 | Maiers et al. | |
| 2003/0099061 | A1 * | 5/2003 | Bahirat et al. ............ | 360/99.08 |
| 2006/0128213 | A1 | 6/2006 | Higeta et al. | |
| 2006/0189182 | A1 | 8/2006 | Higeta et al. | |
| 2008/0089020 | A1 * | 4/2008 | Hiew et al. ................... | 361/684 |
| 2008/0266816 | A1 * | 10/2008 | Ni et al. ...................... | 361/737 |

FOREIGN PATENT DOCUMENTS

WO    WO-2006/022595    3/2006

OTHER PUBLICATIONS

Sugaya, Seiichi "Trends in Enterprise Hard Disk Drives", *Fujitsu Science Tech.*, (Jan. 2006),61-71.
3M TM, et al., "3M TM Serial Attached SCSI(SAS) Connector: Surface Mount, Vertical Plug", (Jun. 14, 2006).

\* cited by examiner

*Primary Examiner*—Gary F. Paumen

(57) ABSTRACT

A card-through-connector fastener for reducing connector distortion is disclosed. One embodiment provides circuit card coupled with electronics associated with an actuator. A connector assembly is also coupled with the circuit card, the connector assembly for conveying data with respect to the circuit card. In addition, a fastener connectively couples the connector assembly with a portion of the housing, the fastener passing through the circuit card and providing fixed support between the connector assembly and the hard disk drive housing to reduce distortion transfer from the circuit card to the connector.

17 Claims, 4 Drawing Sheets

400

RECEIVE A CIRCUIT CARD FOR A HARD DISK DRIVE.
402

COUPLE A CONNECTOR ASSEMBLY WITH THE CIRCUIT CARD.
404

UTILIZE AN EXTENDED FEATURE TO COUPLE THE CONNECTOR ASSEMBLY WITH A PORTION OF A HOUSING OF THE HARD DISK DRIVE, THE EXTENDED FEATURE PASSING THROUGH THE CIRCUIT CARD AND PROVIDING FIXED SUPPORT BETWEEN THE CONNECTOR ASSEMBLY AND THE HARD DISK DRIVE HOUSING TO REDUCE DISTORTION TRANSFER FROM THE CIRCUIT CARD TO THE CONNECTOR
406

CARD-THROUGH-CONNECTOR FASTENER FOR REDUCING CONNECTOR DISTORTION

TECHNICAL FIELD

The present invention relates to the field of hard disk drive development, and more particularly to a method and system for reducing connector deformation of a hard disk drive.

BACKGROUND ART

Hard disk drives (HDD) are used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

In operation, the hard disk is rotated at a set speed via a spindle motor assembly having a central drive hub. There are tracks at known intervals across the disk. When a request for a read of a specific portion or track is received, the HDD aligns a read/write head, via an arm, over the specific track location and the head reads the information from the disk. In the same manner, when a request for a write of a specific portion or track is received, the HDD aligns the head, via the arm, over the specific track location and the head writes the information to the disk.

Since the HDD is a storage device, there is normally a connector that is also associated with the HDD. The connector allows a peripheral device to access the HDD. In general, it is the peripheral device that provides the information to be stored on the HDD. Moreover, it is the peripheral device that will also retrieve stored information from the HDD.

However, as HDD are reduced in size, the tolerances for the components within the hard disk drive, including the connector, are also reduced. For example, a present peripheral connector may have very tight tolerance requirement at the connector pins. In addition, within the HDD case, the circuit card to which the connector is coupled can deform when the HDD is assembled. In many cases, the circuit card deformation can deleteriously affect the HDD connector tolerance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A card-through-connector fastener for reducing connector distortion is disclosed. One embodiment provides circuit card coupled with electronics associated with an actuator. A connector assembly is also coupled with the circuit card, the connector assembly for conveying data with respect to the circuit card. In addition, a fastener connectively couples the connector assembly with a portion of the housing, the fastener passing through the circuit card and providing fixed support between the connector assembly and the hard disk drive housing to reduce distortion transfer from the circuit card to the connector.

BRIEF DESCRIPTION OF THE DRAWINGS

FIG. 4 is a flowchart of a method for utilizing a card-through-connector fastener to reduce connector distortion for a HDD in accordance with one embodiment of the present invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for utilizing a card-through-connector fastener to reduce connector distortion in particular.

Overview

In general, the present technology provides a fastener for connecting the connector fastener to reduce connector distortion. Moreover, the described benefits are realized with minimal modification to the overall HDD manufacturing process in general and to the connector, card and base HDD structure in particular. Furthermore, the present technology is backward compatible with legacy HDD connectors.

Operation

Figure 1:
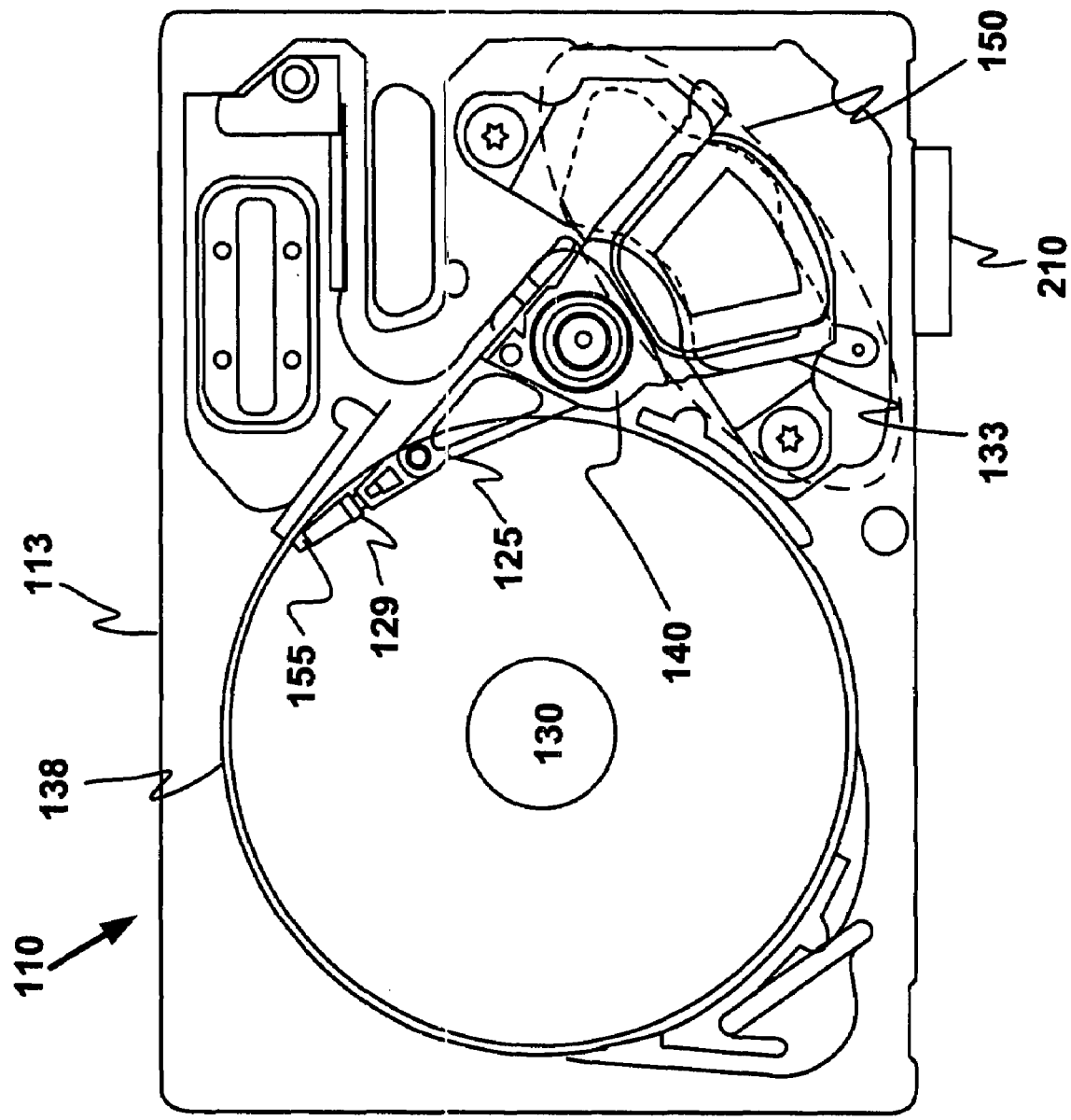
FIG. 1 is a plan view of an HDD with cover and top magnet removed in accordance with one embodiment of the present invention.

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 125. When a number of actuator arms 125 are present, they are usually represented in the form of a comb that is movably or pivotally mounted to base/housing 113. A controller 150 is also mounted to base 113 for selectively moving the actuator arms 125 relative to the disk 138. Actuator assembly 140 may be coupled with a connector assembly 210, which is utilized to convey data between arm electronics and a host system, such as a computer, wherein HDD 110 resides.

In one embodiment, each arm 125 has extending from it at least one cantilevered integrated lead suspension (ILS) 129. The ILS 129 may be any form of lead suspension that can be used in a data access storage device. The slider 155 is usually bonded to the end of ILS 129. The level of integration containing the slider 155, ILS 129, and read/write head is called the Head Gimbal Assembly (HGA).

The ILS 129 has a spring-like quality, which biases or presses the air-bearing surface of slider 155 against disk 138 to cause slider 155 to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly is also mounted to actuator arms 125 opposite the head gimbal assemblies. Movement of the actuator assembly 140 by controller 150 causes the head gimbal assembly to move along radial arcs across tracks on the surface of disk 138.

Figure 2:
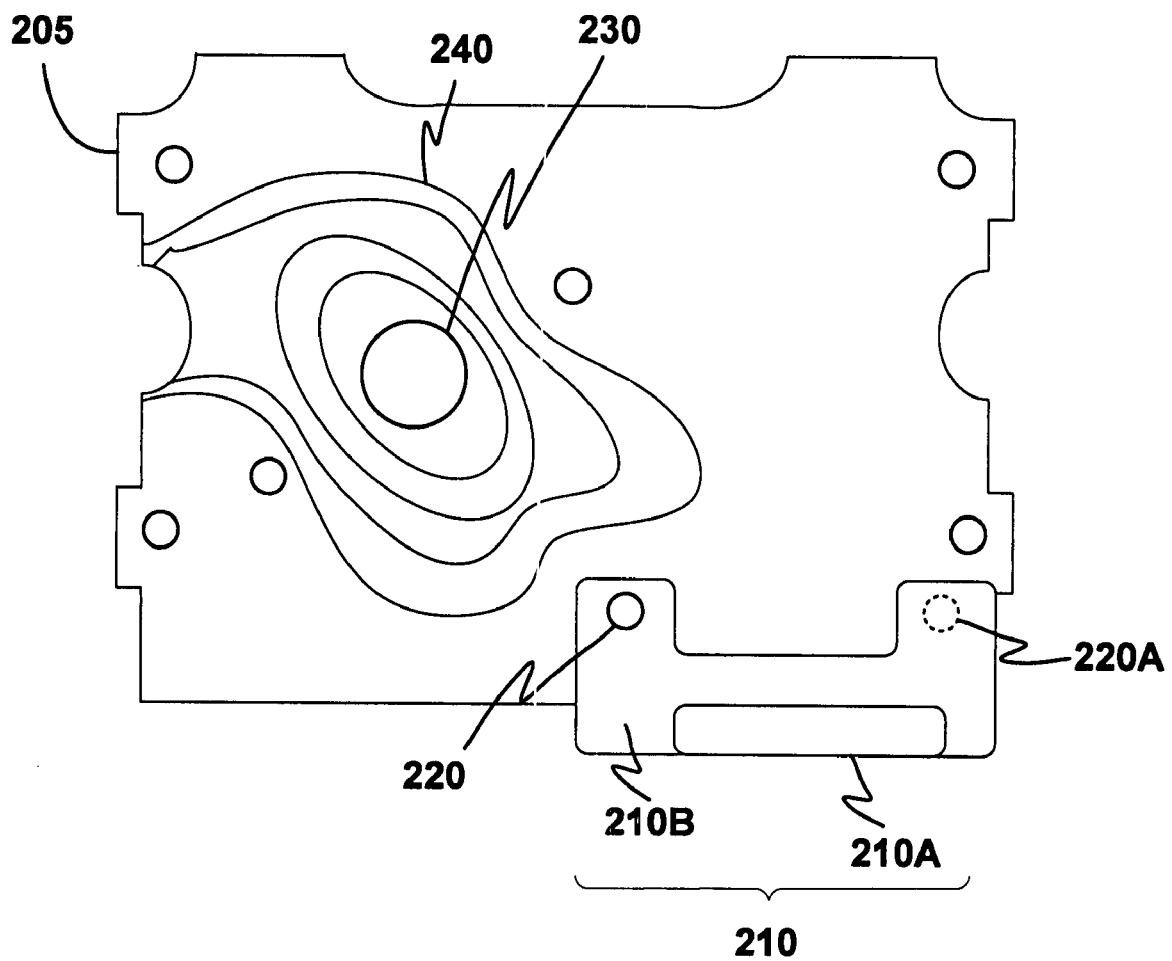
FIG. 2 is a plan view of an electrical card and connector in accordance with one embodiment of the present invention.

Referring now to FIG. 2, a plan view of an electrical card and connector is shown in accordance with one embodiment of the present invention. In one embodiment, electrical card 205 and connector assembly 210 are communicatively coupled and are utilized for conveying data between HDD 110 of FIG. 1 and a peripheral device, such as a housing including a processor, a computer system, or the like. In one embodiment, the peripheral device may include a chain of peripheral devices connected in parallel or series. In general, the conveyed data may include a portion of data provided from the periphery device to be stored at disk 138 may include a request for data from a disk 138 to the periphery device, or any combination thereof. In one embodiment, HDD 110 actually resides in the peripheral device. However, in another embodiment, HDD 110 may reside outside of the peripheral device.

In one embodiment, electrical card 205 is a circuit board or the like which is located within housing 113. Electrical card 205 may include a hole 230 locally aligned with respect to central drive hub 130. In general, electrical card 205 provides the circuitry for enabling signal interaction between the peripheral device and HDD 110.

Connector assembly 210, coupled with electrical card 205, is normally used to establish the interface or connection between electrical card 205 and any periphery components. In one embodiment, connector assembly 210 includes a connection portion 210A and a housing portion 210B. In one embodiment, the housing portion 210B may provide protection for connection portion 210A and also be utilized as the attachment area for connector assembly 210. Although, in one embodiment, connector assembly 210 may include a distinct connection portion 210A and housing portion 210B.

In another embodiment, connector assembly 210 may be manufactured such that connection portion 210A and housing portion 210B are one in the same. However, for purposes of clarity, the present discussion will utilize the term connector assembly 210 in a generic manner as a reference to both connection portion 210A and a housing portion 210B.

In one embodiment, connector assembly 210 may provide plug connection capabilities such as, but not limited to, small computer system interface (SCSI), serial attached SCSI (SAS), fibre channel, serial advanced technology assessment (SATA), universal serial bus (USB), FireWire, or the like. In one embodiment, connector assembly 210 may include pins or other plug type configurations.

However, in another embodiment, connector assembly 210 may be a wireless connection such as wireless USB, infrared (IR), laser, Bluetooth or other type of port which can provide wireless connectivity to one or more peripheral devices. Moreover, connector assembly 210 may include one or more different configurations of connections. The different configurations may also include a mixture of wired and wireless configurations, or the like.

Referring still to FIG. 2, card deformations 240 are also shown. In general, card deformations 240 are deformations in the electrical card 205. In one embodiment, card deformations 240 are inherent with electrical card 205. However, in another embodiment, card deformations 240 may be caused by a tolerance stack-up. For example, during the installation of electrical card 205 within housing 113 or at any time during the HDD 110 assembly process, the number of components within HDD 110 and their associated tolerances may be combined. In one embodiment, the tolerance stack-up may result in significant card deformations 240.

Card deformations 240 are of particular significance since they can detrimentally affect the orientation of connector assembly 210. In other words, since connector assembly 210 is physically coupled with electrical card 205, card deformations 240 of electrical card 205 can be transferred to connector assembly 210. However, in another embodiment, the tolerance stack-up may directly affect the orientation of connector assembly 210. The resulting deformations of connector assembly 210 can drive connector assembly 210 out of its own tolerance resulting in unaligned connectors, connector pins, connector ports, and the like.

Referring still to FIG. 2, a fastener 220 is utilized to provide a coupling between connector assembly 210 and housing 113 via electrical card 205. In one embodiment, connector assembly 210 includes a single fastener 220. In another embodiment, connector assembly 210 includes a plurality of fasteners 220. In general, as further described and shown in FIGS. 3A and 3B, fastener 220 on one, or possibly both, side(s) of connector assembly 210 is used to dissipate the strain energy of card deformations 240 before the card deformations 240 can affect connector assembly 210.

That is, since the fastener 220 couples connector assembly 210 with housing 113 and not just electrical card 205, most or all of the effects of card deformations 240 are countered by the much higher rigidity of housing 113. Basically, coupling connector assembly 210 with the housing 113 allows the large Young's modulus of the housing 113 to overcome the much smaller Young's modulus of electrical card 205.

Figure 3A:
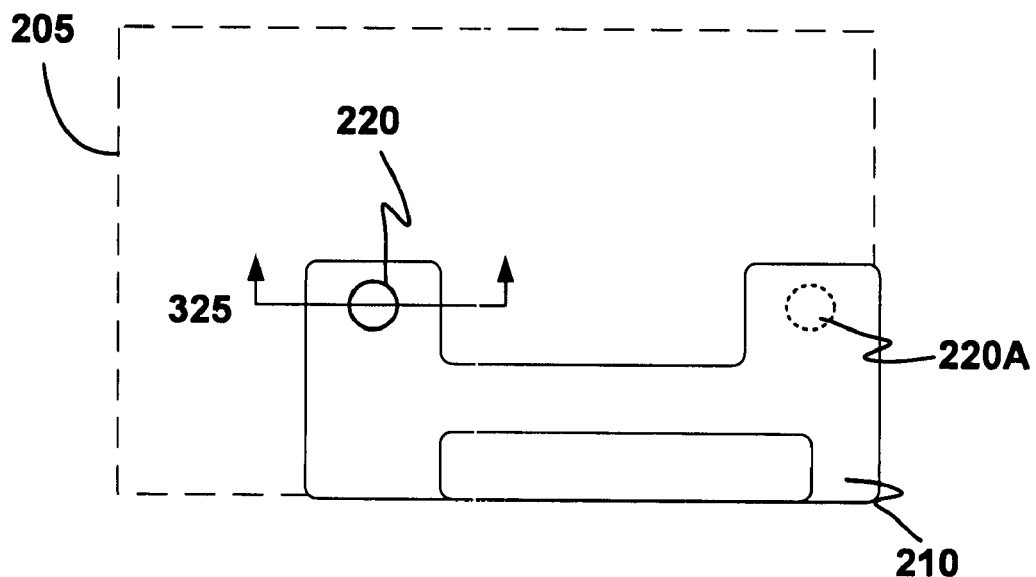
FIG. 3A is a top view of the connector including a fastener in accordance with one embodiment of the present invention.

With reference now to FIG. 3A, a plan view of connector assembly 210 coupled with electrical card 205 is shown in accordance with one embodiment of the present invention. In one embodiment, connector assembly 210 includes a single fastener 220. However, in another embodiment, connector assembly 210 includes a plurality of fasteners such as 220 and 220A. In one embodiment, as described herein, the fastener 220 provides an extended feature from housing 113 to connector assembly 210 such that connector assembly 210 may utilize housing 113 to overcome any torsion characteristics received at connector assembly 210. As stated herein, the torsion characteristics may include card deformations 240, stack-up of manufacturing tolerances during HDD 110 assembly, and the like.

Figure 3B:
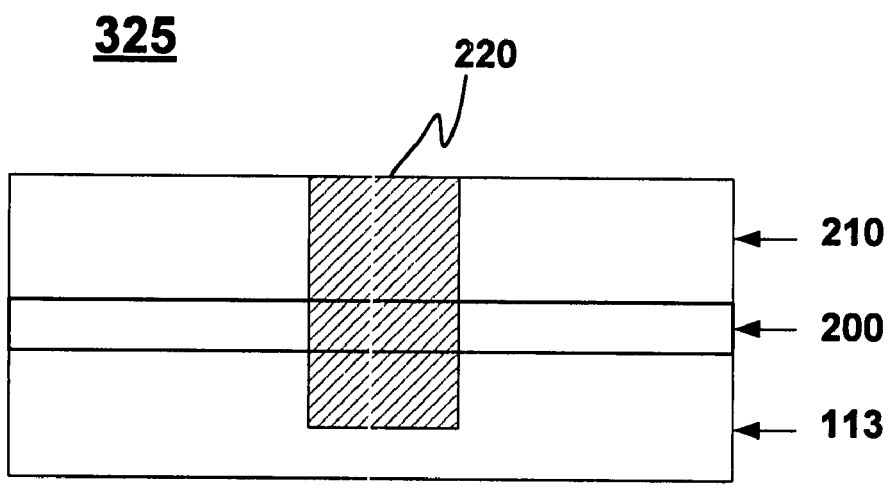
FIG. 3B is a cross-sectional view of the connector including a fastener in accordance with one embodiment of the present invention.

Referring now to FIG. 3B, a cross section view of connector assembly 210 coupled with electrical card 215 and housing 113 is shown in accordance with one embodiment of the present invention. In stack 325, connector assembly 210 is coupled with base casting 113 via a fastener 220 which passes through electrical card 205. In one embodiment, fastener 220 is a fastening device such as a screw.

However, the present technology is not limited to fastener 220 being a screw. For example, fastener 220 may be a pin, bolt, rivet, press-stud, nail or the like. In addition, there may be instances when the fastener 220 is formed as, or coupled with, a portion of the base of HDD housing 113. For example, the base of HDD housing 113 may be cast to include fastener 220 as an extended feature over which electrical card 205 and connector assembly 210 may be placed during assembly. In addition, fastener 220 may then be integrated with a portion of the top of HDD housing 113 such that the electrical card 205 and connector assembly 210 will remain locally fixed.

In another embodiment, there may be instances when fastener 220 is formed as, or coupled with, a portion of connector assembly 210. For example, connector assembly 210 may be manufactured or added to such that fastener 220 is incorporated therewith as an extended feature. Then, during assembly, fastener 220 will be integrated with a receiving portion at the top or bottom of housing 113 while passing through a hole in electrical card 205, such that connector assembly 210 may utilize housing 113 to overcome any torsion characteristics received at connector assembly 210.

As shown in FIG. 3B, fastener 220 may only enter a portion of housing 113. Moreover, in one embodiment, a feature may be built on housing 113 to provide or support fastener 220. In another embodiment, fastener 220 may only enter a portion of connector assembly 210. Moreover, in one embodiment, a feature may be built on connector assembly 210 to provide or support fastener 220.

With reference now to FIG. 4, a flowchart of a method for utilizing a card-through-connector fastener to reduce connector distortion is shown in accordance with one embodiment of the present invention. The present technology significantly reduces or eliminates the effects of tolerance stack-up as well as card deformation without requiring significant tightening of the connector tolerances. In so doing, significant manufacturing savings can be realized. Moreover, the present technology is within form factor requirements for the HDD and is reverse compatible with many presently existing and legacy HDDs.

With reference now to 402 of FIG. 4 and to FIG. 2, one embodiment receives a circuit card, such as electrical card 205, for HDD 110. In one embodiment, electrical card 205 is coupled with the electronics associated with an actuator assembly 140 of HDD 110.

Referring now to 404 of FIG. 4 and to FIG. 2, one embodiment couples connector assembly 210 with electrical card 205. As described herein, connector assembly 210 may be a pin type connector such as a small computer system interface (SCSI), serial attached SCSI (SAS), fibre channel, serial advanced technology assessment (SATA), universal serial bus (USB) and FireWire. In another embodiment, connector assembly 210 may be a wireless connector such as a wireless USB, infrared (IR), laser, Bluetooth or the like.

With reference now to 406 of FIG. 4 and to FIG. 2, one embodiment utilizes an extended feature to couple connector assembly 210 with a portion of housing 113 of HDD 110. In one embodiment, the extended feature passes through electrical card 205 and provides fixed support between the connector assembly 210 and housing 113 to reduce distortion transfer from the electrical card 205 to connector assembly 210. In one embodiment, the extended feature is a card-through-connector fastener such as fastener 220. Moreover, in one embodiment, fastener 220 reduces or eliminates the effects of tolerance stack-up as well as card deformation subjected on connector assembly 210, thereby improving overall connector assembly 210 reliability.

As described herein, including FIG. 3B, fastener 220 may be a fastener such as, but not limited to, a screw, a pin, a bolt, a rivet, a press-stud, or nail. In another embodiment, fastener 220 may be formed as a portion of the housing 113. In that case, when assembling electrical card 205 and connector assembly 210 with respect to fastener 220 of housing 113, the fastener 220 passes through a portion of electrical card 205 before contacting or coupling with connector assembly 210.

In general, fastener 220 is coupled with one, or possibly both, side(s) of connector assembly 210 to reduce or eliminate the effects of tolerance stack-up on connector assembly 210. Additionally, fastener 220 dissipates the strain energy of card deformations 240 with respect to connector assembly 210, thereby improving overall connector reliability. That is, since fastener 220 couples connector assembly 210 with housing 113 and not just electrical card 205, most or all of the effects of card deformations 240 will not affect connector assembly 210. In other words, by utilizing fastener 220 the effects of card deformations 240 are countered by the higher rigidity of housing 113.

Thus, embodiments of the present invention provide a method and apparatus for utilizing a card-through-connector fastener to reduce connector distortion in a hard disk drive. Furthermore, embodiments described herein provide a tighter tolerance for the connector without requiring significant changes in electrical card 205 and connector assembly 210 configurations. Moreover, the method and apparatus for utilizing a card-through-connector fastener to reduce connector distortion are capable of being backward applied to presently manufactured or previously manufactured HDDs. In addition, the benefits described herein are realized with minimal modification to the overall HDD manufacturing process in general and to the connector assembly, HDD housing and electrical card in particular.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for utilizing a card-through-connector fastener to reduce distortion of a connector for a hard disk drive, said method comprising:

receiving a circuit card for a hard disk drive;

coupling a connector assembly with said circuit card;

forming said extended feature as a portion of the hard disk drive housing;

assembling said circuit card and said connector assembly with respect to said extended feature of the hard disk drive housing, said extended feature passing through a portion of said circuit card when coupled with said connector assembly; and utilizing an extended feature to couple said connector assembly with a portion of a housing of said hard disk drive, said extended feature passing through said circuit card and providing fixed support between said connector assembly and said hard disk drive housing to reduce distortion transfer from said circuit card to said connector.

2. The method of claim 1 further comprising:
coupling said circuit card with electronics associated with an actuator assembly of said hard disk drive.

3. The method of claim 1 further comprising:
utilizing a card-through-connector fastener as said extended feature for coupling said connector assembly with a portion of a housing of said hard disk drive.

4. The method of claim 1, wherein said extended feature is selected from the group of fasteners consisting of: a screw, a pin, a bolt, a rivet, a press-stud, or nail.

5. The method of claim 1 wherein said connector is selected from the group of pin type connectors consisting of: a small computer system interface (SCSI), serial attached SCSI (SAS), fibre channel, serial advanced technology assessment (SATA), universal serial bus (USB) and FireWire.

6. The method of claim 1 wherein said connector is selected from the group of wireless connectors consisting of: wireless USB, infrared (IR), laser, Bluetooth or the like.

7. A hard disk drive comprising:
a housing;
a disk pack mounted to the housing and having a plurality of disks that are rotatable relative to the housing;
an actuator coupled to said housing, said actuator comprising a plurality of suspensions arms for reaching over the plurality of disks;
a circuit card coupled with electronics associated with said actuator;
a connector assembly coupled with said circuit card, said connector assembly for conveying data with respect to said circuit card; and
a card-through-connector fastener coupling said connector assembly with a portion of said housing, said card-through-connector fastener coupled with the hard disk drive housing and passing through a portion of said circuit card to connectively couple said housing with said connector assembly, said card-through-connector fastener passing through said circuit card and providing fixed support between said connector assembly and said hard disk drive housing to reduce distortion transfer from said circuit card to said connector.

8. The hard disk drive of claim 7 wherein said connector assembly conveys data between said circuit card and a peripheral system.

9. The hard disk drive of claim 8 wherein said peripheral system is a computing system.

10. The hard disk drive of claim 7 wherein a plurality of said card-through-connector fasteners are utilized for coupling said connector assembly with a portion of a housing of said hard disk drive.

11. The hard disk drive of claim 7 wherein said card-through-connector fastener is selected from a group of fasteners consisting of: a screw, a pin, a bolt, a rivet, a press-stud, or nail.

12. The hard disk drive of claim 7 wherein said card-through-connector fastener is formed as a portion of the hard disk drive housing and passes through a portion of said circuit card to connectively couple said housing with said connector assembly.

13. A card-through-connector fastener for a hard disk drive comprising:
a circuit card coupled with electronics associated with said actuator;
a connector assembly coupled with said circuit card, said connector assembly for conveying data with respect to said circuit card; and
a fastener connectively coupling said connector assembly with a portion of said housing, said fastener formed as a portion of the hard disk drive housing and passes through a portion of said circuit card to connectively couple said housing with said connector assembly, said fastener passing through said circuit card and providing fixed support between said connector assembly and said hard disk drive housing to reduce distortion transfer from said circuit card to said connector.

14. The card-through-connector fastener of claim 13 wherein said connector assembly provides data conveying capability between said circuit card and a peripheral system.

15. The card-through-connector fastener of claim 13 wherein at least two of said fastener are utilized for fixedly coupling said connector assembly with a portion of a housing of said hard disk drive.

16. The card-through-connector fastener of claim 13 wherein said fastener is selected from a group of fasteners consisting of: a screw, a pin, a bolt, a rivet, a press-stud, or nail.

17. The card-through-connector fastener of claim 13 wherein said fastener is coupled with the hard disk drive housing and passes through a portion of said circuit card to connectively couple said housing with said connector assembly.

* * * * *